United States Patent [19]
Clarke

[11] Patent Number: 5,194,773
[45] Date of Patent: Mar. 16, 1993

[54] ADJUSTABLE SPEED SPLIT STATOR ROTARY MACHINE

[76] Inventor: Patrick W. Clarke, 244 Sagamore Dr., Murray Hill, N.J. 07974

[21] Appl. No.: 763,983

[22] Filed: Sep. 23, 1991

Related U.S. Application Data

[63] Continuation-in-part of Ser. No. 763,955, Sep. 23, 1991, which is a continuation-in-part of Ser. No. 462,059, Jan. 8, 1990, abandoned.

[51] Int. Cl.$^5$ .................... H02K 21/04; H02K 23/02; H02K 01/12
[52] U.S. Cl. .................... 310/112; 310/181; 310/254
[58] Field of Search ............ 310/112, 115, 118, 126, 310/170, 181, 254

[56] References Cited

U.S. PATENT DOCUMENTS

| Re. 12,793 | 5/1908 | Wells, Jr. | 307/47 |
|---|---|---|---|
| 977,328 | 11/1910 | Richter | 307/47 |
| 996,762 | 4/1911 | Hertwig et al. | 307/47 |
| 1,014,373 | 1/1912 | Bijur | 307/47 |
| 1,139,294 | 5/1915 | Johnson | 307/47 |
| 1,246,643 | 11/1917 | Neuland | 290/5 |
| 1,708,909 | 4/1929 | Spencer | 310/212 |
| 2,871,438 | 1/1959 | Annis | 322/13 |
| 3,242,365 | 3/1966 | Kober | 310/268 |
| 3,280,400 | 10/1966 | Roe | 318/243 |
| 3,290,574 | 12/1966 | Roe | 318/214 |
| 3,405,296 | 10/1968 | Stilley et al. | 310/116 |
| 3,435,315 | 3/1969 | Kordik et al. | 318/239 |
| 3,586,938 | 6/1971 | Le Gall | 318/166 |
| 3,940,668 | 2/1976 | Apsit et al. | 318/226 |
| 4,087,698 | 5/1978 | Myers | 307/84 |
| 4,177,414 | 12/1979 | Roesel, Jr. et al. | 322/28 |
| 4,228,391 | 10/1980 | Owen | 322/35 |
| 4,229,689 | 10/1980 | Nickoladze | 322/32 |
| 4,525,661 | 6/1985 | Mucsy et al. | 322/4 |
| 4,686,375 | 8/1987 | Gottfried | 290/2 |
| 4,785,213 | 11/1988 | Satake | 310/116 |
| 4,879,484 | 11/1989 | Huss | 310/114 |
| 4,920,293 | 4/1990 | Kanda | 310/116 |
| 4,945,296 | 7/1990 | Satake | 318/538 |
| 4,959,578 | 9/1990 | Varga | 310/268 |
| 5,051,639 | 9/1991 | Satake et al. | 310/112 |
| 5,068,559 | 11/1991 | Satake et al. | 310/112 |

FOREIGN PATENT DOCUMENTS

| 274357 | 10/1957 | Japan . |
|---|---|---|
| 49-86807 | 8/1974 | Japan . |
| 54-29005 | 3/1979 | Japan . |
| 59-191461 | 10/1984 | Japan . |
| 62-260590 | 11/1987 | Japan . |

*Primary Examiner*—Steven L. Stephan
*Assistant Examiner*—D. R. Haszko
*Attorney, Agent, or Firm*—Weingarten, Schurgin, Gagnebin & Hayes

[57] ABSTRACT

An inductance machine having a rotor assembly electromagnetically coupled to first and second synchronous magnetic fields. The first and second synchronous magnetic fields have a relative angular displacement about the rotor axis which may be adjusted.

3 Claims, 5 Drawing Sheets

ADJUSTABLE SPEED SPLIT STATOR ROTARY MACHINE

RELATED APPLICATION

This application is a continuation-in-part of application Ser. No. 07/763,955, filed Sep. 23, 1991, also filed on even date herewith) which is also a continuation-in-part of application Ser. No. 07/462,059, filed Jan. 8, 1990 now abandoned.

FIELD OF THE INVENTION

This invention relates to inductance machines and more particularly to an inductance machine having adjustable characteristics operative for motor and generator applications.

BACKGROUND OF THE INVENTION

A unique inductance machine is the subject of the copending applications identified above wherein a plurality of stators are cooperative with a rotor assembly. In general, the stators are rotatable about the axis of the rotor and may be angularly adjusted, with respect to one another. In a generator configuration, the output voltage of the machine is a function of the relative angular displacement between the stators about the axis of the rotor. The relative angular displacement between the stators can be controlled to provide an adjustable voltage output. The generator configuration is the subject of copending application Ser. No. 07/462,059, filed Jan. 8, 1990. In a motor configuration, which is the subject of the copending application Ser. No. 07/763,955, filed contemporaneously with this application, the stators are also angularly adjustable about the rotor axis. In this case however, the rotor shaft speed is a function of the relative angular displacement between the stators. Thus the rotor speed is controllable by adjustment of the relative angular displacement.

This unique machine configuration has other attendant advantages and areas of utility which are the subject of this application.

SUMMARY OF THE INVENTION

The present invention provides a rotor assembly electromagnetically coupled to first and second synchronous magnetic fields. The magnetic fields are preferably provided by respective stators disposed about the rotor assembly, with the stators being angularly adjustable about the rotor axis to achieve an intended angular displacement with respect to one another. Typically, one of the stators is fixed and the other stator is angularly adjustable through a predetermined angle to adjust the angular displacement relative to the fixed stator. The machine can be constructed as a single-phase, a three-phase or other multiphase machine. The rotor assembly can comprise a single rotor cooperative with the first and second stators or individual rotors can be cooperative with respective stators. The rotor assembly can be of squirrel cage or wound form. Implementation of particular embodiments of the invention can take advantage of details of synchronous machine construction well known in the motor and generator art.

BRIEF DESCRIPTION OF THE DRAWING

These and further features of the invention may be understood with reference to the accompanying specification and drawing in which.

DETAILED DESCRIPTION

Figure 1:
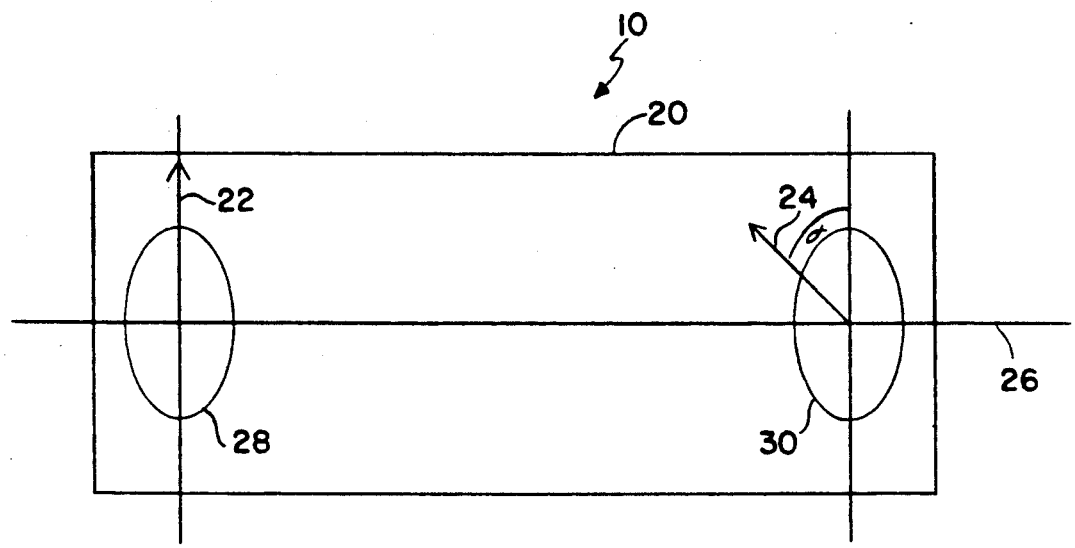
FIG. 1 is an diagrammatic view of an embodiment of the invention.

Referring to FIG. 1, the present invention provides an induction machine 10 having a rotor assembly 20 electromagnetically coupled to first 22 and second 24 synchronous magnetic fields. The first 22 and second 24 magnetic fields have a relative angular displacement $\alpha$ about the rotor axis 26. This relative angular displacement $\alpha$ can be varied. The magnetic fields are preferably provided by respective stators 28, 30, disposed about the rotor assembly 20 and with the stators 28, 30, being angularly adjustable about the rotor axis 26 to achieve an intended angular displacement $\alpha$. Typically, one of the stators 28, 30 is fixed and the other stator 28, 30 is angularly adjustable through a predetermined angle $\alpha$ to adjust the angular displacement relative to the fixed stator 28, 30.

The machine can be constructed as a single-phase, a three-phase or other multiphase machine.

The rotor assembly 20 can comprise a single rotor 20 cooperative with the first 28 and second 30 stators, as in FIG. 1, or individual rotors can be cooperative with respective stators 24, 28. Additionally, the rotor assembly 20 can be of squirrel cage or wound form. Implementation of particular embodiments of the invention can take advantage of details of synchronous machine construction well known in the motor and generator art.

Figure 2:
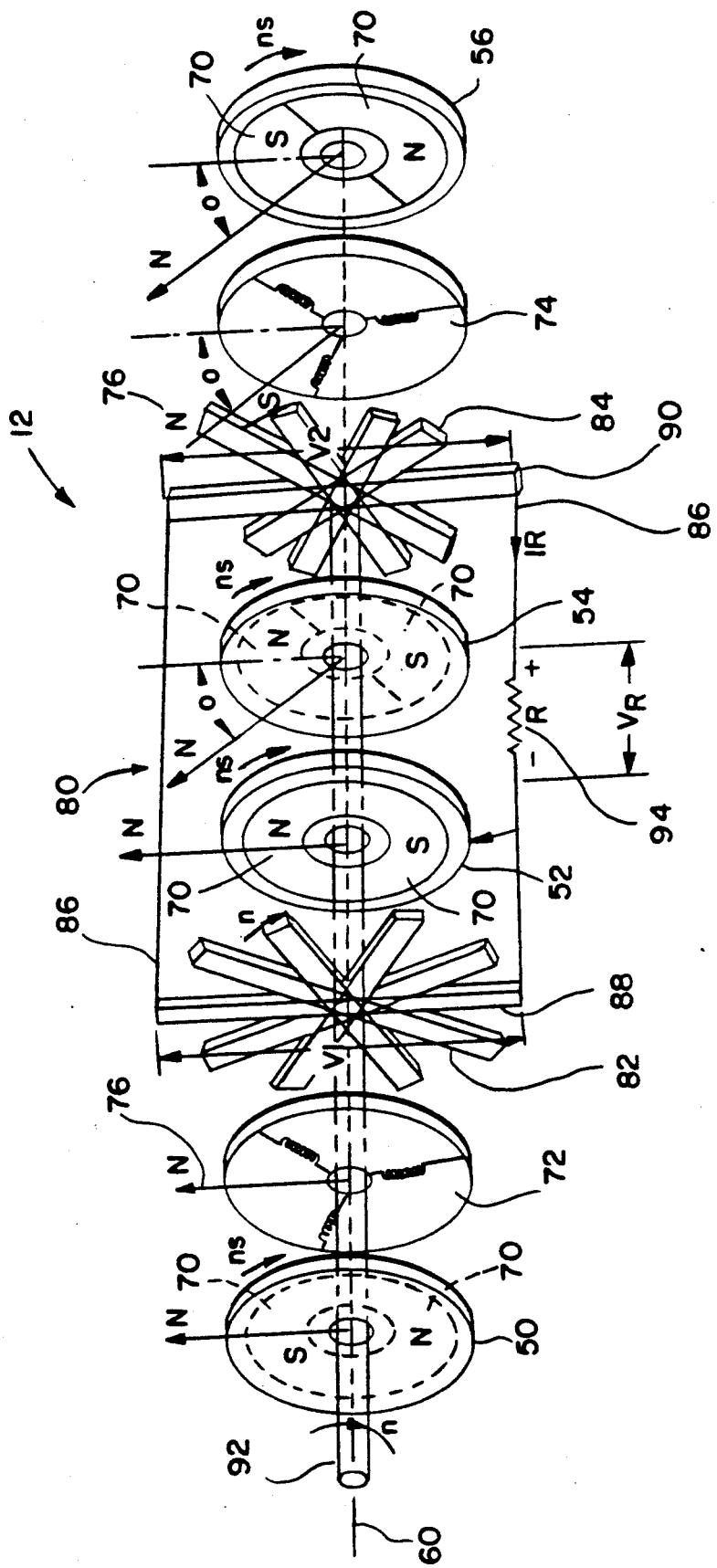
FIG. 2 is an exploded diagrammatic view of an embodiment of the invention used as a motor.

An embodiment of a novel split stator permanent magnet squirrel cage machine in accordance with the invention is shown in FIG. 2 in an exploded perspective form. Field plates 50, 52, 54 and 56 are disposed along and are each freely rotatable about a shaft 92. Each of the field plates 50, 52, 54, 56 have a plurality of magnets 70 on their faces with polarizations providing an axial field between the field plate pairs 50 and 52; and 54 and 56. That is, an axial field exists between plates 50 and 52 and between plates 54 and 56. The field plates 50, 52, 54, 56 are of sufficient thickness such that the magnetic flux is contained within the respective axial air gaps between each pair of plates. The fields in the air gaps are of sufficient strength that the field plates within each pair remain accurately aligned with one another in angular orientation at all times. However, a minimal magnetic field exists between field plates 52 and 54 and thus the magnetically coupled pairs, 50 and 52 and 54 and 56 can freely rotate with respect to one another.

Referring again to FIG. 2, a first stator input winding 72 is disposed along shaft 92 between field plates 50 and 52, and a second stator input winding 74 is disposed along shaft 92 between field plates 54 and 56. In this embodiment, the first stator input winding 72 has a predetermined angular orientation about the common shaft 92, while the second stator input winding 74 is adjustable in angular orientation about the common shaft 92 relative to the first stator input winding 72. The relative angular position of the first stator input winding 72 as determined, for example by the generated magnetic vector 76, with respect to the second stator input winding 74, again as determined by the generated magnetic vector 76, is designated by the symbol $\alpha$.

A squirrel cage rotor 80 includes a first radially spoked wheel 82 disposed between first stator input winding 72 and field plate 52 and a second radially spoked wheel 84 disposed between second stator input winding 74 and field plate 54. These radially spoked wheels 82, 84 are fixed to the shaft 92 and are electrically connected to each other by axial shorting bars, a single pair 86 of which is illustrated. The shaft 92 of the rotor 80 is thus coaxial with the axis of rotation o the field plates 50, 52, 54, 56, and with the split stator input windings 72 and 74.

Figure 3:
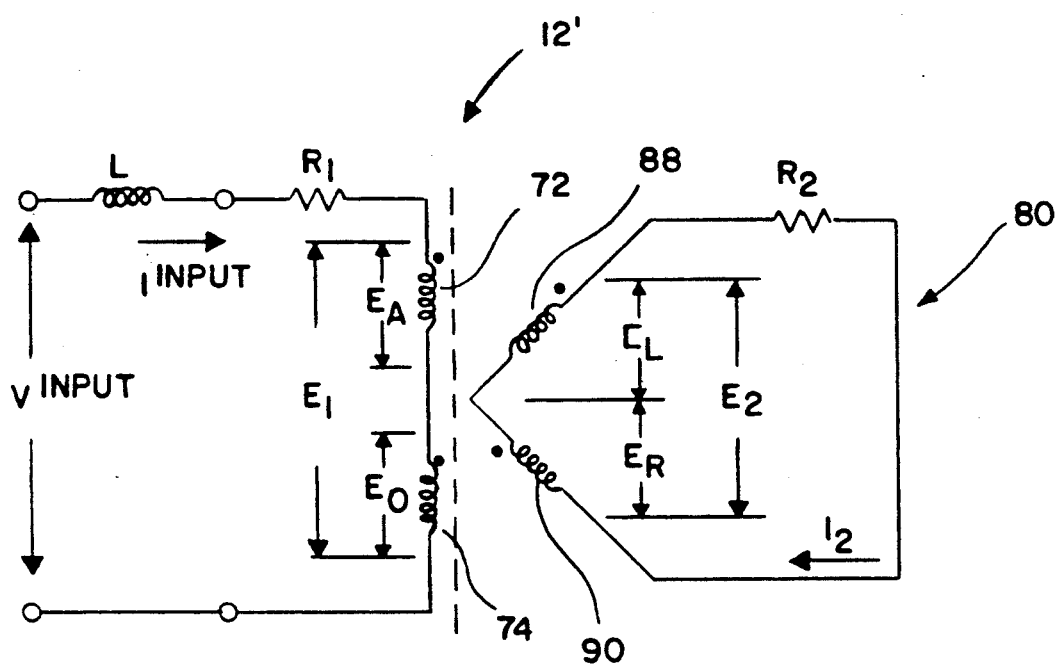
FIG. 3 is a schematic equivalent circuit diagram of the embodiment of the invention shown in FIG. 2 in which the windings are connected in series.
Figure 4:
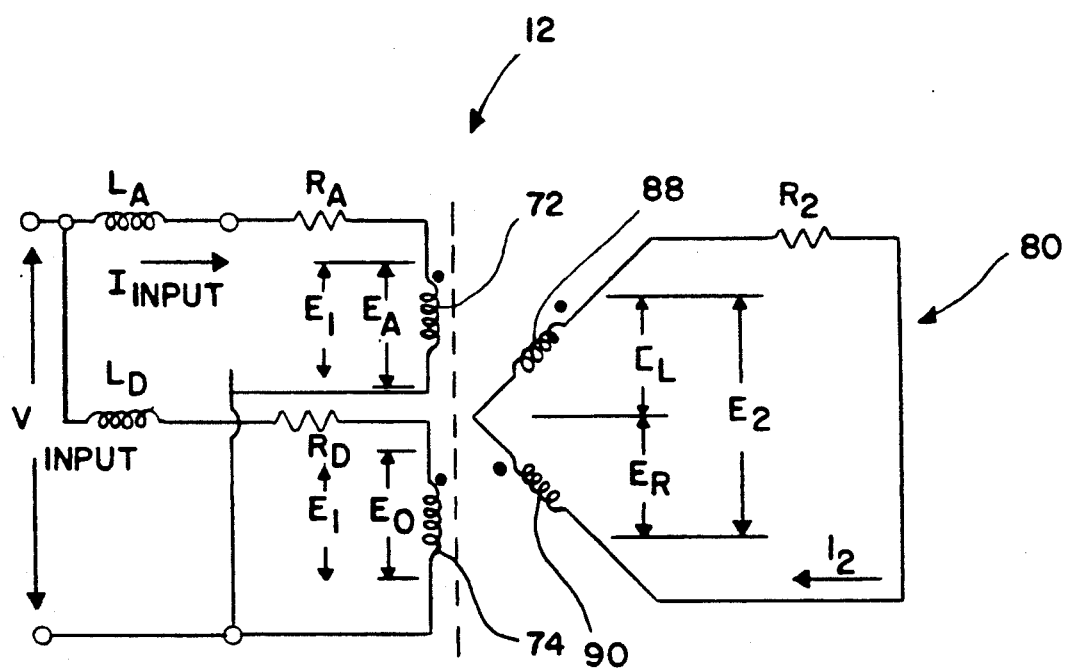
FIG. 4 is a schematic equivalent circuit diagram of the embodiment of the invention shown in FIG. 2 in which the windings are connected in parallel

In operation, the split stator input windings 72 and 74 are energized from a suitable AC source. Referring also to FIGS. 3 and 4, the stator input windings 72, 74 may be connected in series (FIG. 3) or in parallel (FIG. 4) as desired to suit the voltage levels and parameters of a particular machine.

Stator input winding 72 generates an axial magnetic field rotating at synchronous speed in the air gap between field plate 50 and field plate 52, and the field plates 50 and 52 track the generated field as it rotates about the axis 60 of the common shaft 92. The generated field rotates around the axis 60 at a speed which is proportional to the line frequency of the voltage supplied to input winding 72. Thus, the field plates 50, 52 rotate about the axis 60 synchronously with the generated field, as in a conventional permanent magnet synchronous motor. In a similar manner, the field plates 54 and 56 track the generated field of stator input winding 84. The orientation of the field generated by the stator input winding 84 can be adjusted by physically rotating the stator input winding 84 about the axis 60, through an angle $\alpha$.

Field plates 50 and 52 rotating past the interposed conductive spoke 88 of the rotor 80 induce a voltage V1 between the ends of the spoke 88. Similarly, field plates 54 and 56 rotating past the interposed conductive spoke 90 of the rotor 80 induce a voltage V2 between the ends of the spoke 90. The voltages V1 and V2 induced in the conductive spokes 88, 90 at the respective ends of the squirrel cage winding of the rotor 80 are out of phase by an amount directly related to the rotational displacement $\alpha$ of stator input winding 74 relative to the stator input winding 72.

The resulting rotor voltage $V_R$ is equal to the vector sum of the induced voltages V1 and V2. The resulting current flow $I_R$ in the spokes 88 and 90, interacting with the air gap fields, generates a torque in the direction of field rotation as in a conventional induction motor. The speed of rotation of the squirrel cage and of the shaft to which it is affixed, must be less than that of the generated magnetic field because the voltage, current and thus torque generation in the machine depends upon the speed difference, as in a conventional motor.

Thus the resultant excitation of the rotor 80 can be varied by varying the angle $\alpha$. As is well known, the resistance and reactance of the rotor define the shape of the torque-speed curve of an induction machine. By varying the angle $\alpha$, the operating point can be varied over the range of torques and speeds.

Other embodiments, in which the machine includes a third stator positioned to couple excess rotor currents back into the AC power supply or in which the magnetic fields are radially directed, are contemplated.

Figure 5:
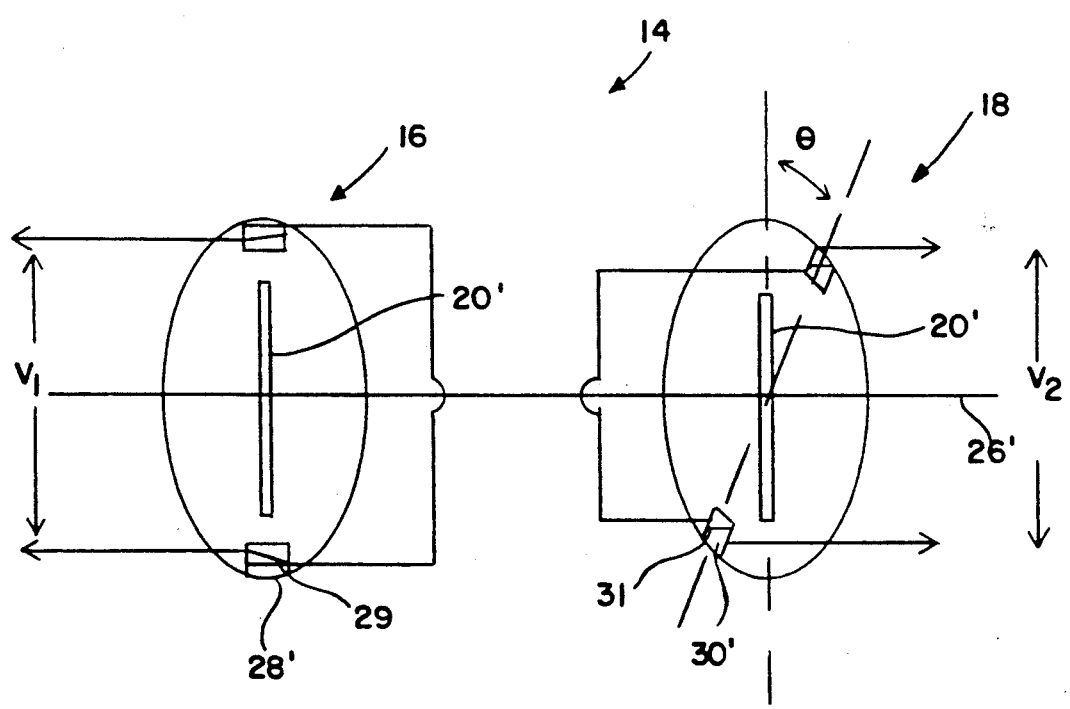
FIG. 5 is a diagrammatic view of an embodiment of the invention used as a generator.

Similarly, an embodiment of a novel split stator machine in accordance with the invention and used as a generator 14 is shown in FIG. 5. In this embodiment, a generator system 14 includes a first generator 16 having a stator 28' including stator windings 29; a second generator 18 having a stator 30' including stator windings 31, and a rotor 20' rotatable about an axis 26'. When the rotor 20' is rotated about axis 26', a voltage V1 is generated by the first generator 16 and a voltage V2 is generated by the second generator 18. The stator 30' of the second generator 18 is displaced at an angle $\theta$ relative to the stator 28' of the first generator 16.

Figure 6:
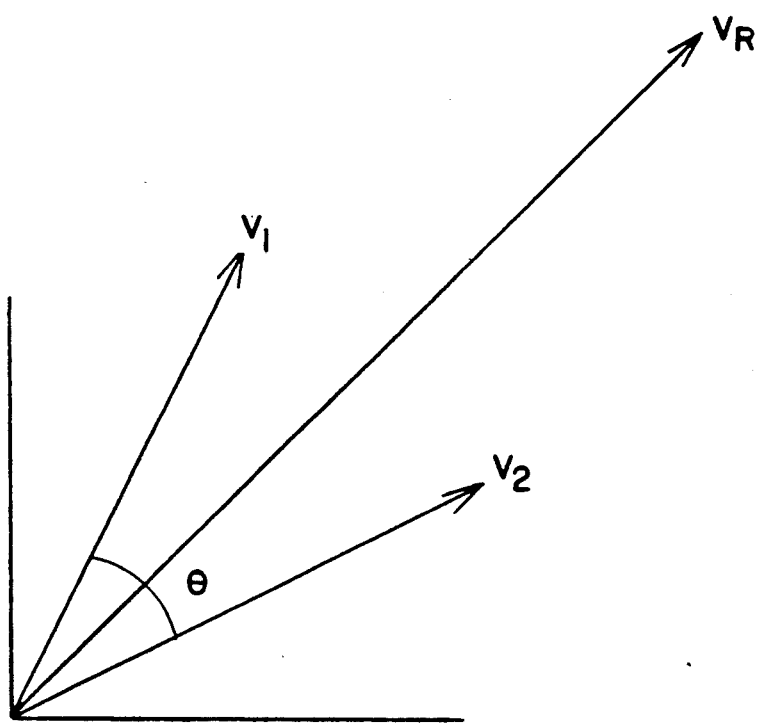
FIG. 6 is a voltage diagram for the embodiment of FIG. 5.

If the output voltages V1 and V2 are combined by serially connecting the first generator 16 and the second generator 18, the resulting voltage $V_R$ is the vector sum of the two voltages V1 and V2. The relationship between $V_R$ and V1 and V2 is shown in FIG. 6. The resulting voltage $V_R$ is in part determined by the angle $\theta$ and hence may be varied by adjusting the relative angle $\theta$ between the stator 28' of the first generator 16 and the stator 30' of the second generator 18.

It is understood that other modifications or embodiments are possible which will still be within the scope of the appended claims. These and other examples of the concept of the invention illustrated above are intended by way of example and the actual scope of the invention is to be determined solely from the following claims.

What is claimed is:

1. An electric rotating machine providing an electrical characteristic that is determinable by mechanical adjustment, said machine comprising:
    a rotor assembly mounted on a shaft having a long axis and rotatable with the shaft;
    a first stator assembly having a stator winding;
    a second stator assembly having a stator winding;
    each said first and second stator assembly disposed about different portions of said rotor assembly;
    each said stator assembly including plural permanent magnets providing an axially-directed field through respective ones of said different rotor portions, which axially-directly fields are substantially parallel to said long axis of said shaft;
    wherein at least one of the first and second stator assemblies is angularly mechanically rotatable about said axis of said shaft to provide an intended phase offset between the axially-directed fields of the first stator assembly with respect to the axiallydirected fields of the second stator assembly;
    wherein said windings of said first and second stator assemblies are adapted for external connection;
    said electrical characteristic of said electric rotating machine is determined by the particular angular orientation of said first stator relative to said second stator about the long axis of the shaft.

2. The invention of claim 1, wherein said electric characteristic is the speed of rotation of said shaft and said external connection is to an ac source.

3. The invention of claim 1, wherein said electric characteristic is voltage generation and said external connection is to a load.

* * * * *